United States Patent [19]

Kawazoe

[11] Patent Number: 4,852,836

[45] Date of Patent: Aug. 1, 1989

[54] TRIPOD

[76] Inventor: Michio Kawazoe, 30-11 Higashi 5 chome, Narita Suginamiku Tokyo, Japan

[21] Appl. No.: 112,347

[22] Filed: Oct. 22, 1987

[51] Int. Cl.$^4$ ............................................. F16M 11/38
[52] U.S. Cl. ................................. 248/168; 248/188.8
[58] Field of Search ............ 248/168, 170, 440, 188.8, 248/188.9, 188.91, 169, 171, 436, 439; 108/123, 128, 153, 157

[56] References Cited

U.S. PATENT DOCUMENTS

| | | | |
|---|---|---|---|
| 473,357 | 4/1892 | Servus | 248/188.91 X |
| 1,361,469 | 12/1920 | Kingsbury | 248/168 |
| 1,486,508 | 3/1924 | Weeks | 248/188.91 |
| 1,650,747 | 11/1927 | Thalhammer | 248/168 |
| 3,312,432 | 4/1967 | Pfeiffer | 248/188.91 X |
| 3,483,999 | 12/1969 | Barrett | 248/168 X |
| 4,266,748 | 5/1981 | Dalton | 248/168 X |
| 4,354,437 | 10/1982 | Logan | 108/153 |
| 4,640,482 | 2/1987 | Rogers | 248/168 |

Primary Examiner—J. Franklin Foss
Attorney, Agent, or Firm—Donald D. Mon; David O'Reilly.

[57] ABSTRACT

This invention relates to a tripod in which the ends of each pair of legs are connected by elastic means to prevent the bending of the legs.

4 Claims, 2 Drawing Sheets

TRIPOD

FIELD OF THE INVENTION

This invention relates to a tripod for a still camera, a movie camera, a video camera or a light etc., particularly to a tripod movable on caster wheels.

BACKGROUND OF THE INVENTION

Currently, a dolly is used to provide easy movement for a tripod. However, the dolly is heavy and expensive and restricts the height of the tripod because the distance between the legs is determined by its base plate. To overcome these defects, caster wheels are provided at the ends of each leg for movement. However, bending of the legs occurs, and the height of the camera becomes unstable.

BRIEF DESCRIPTION OF THE INVENTION

The object of this invention is to eliminate this drawback by interconnecting the ends of the legs by elastic means such as a rubber belt or a springy line. The height of the camera at the head of the tripod can be adjusted easily by stretching or contracting the elastic means while the elastic means prevents bending of the legs. The height of the camera is therefor stable.

Another object of this invention is to protect a tripod against bending of its legs by a light and inexpensive device.

The above and other features of this invention will be fully understood from the following detailed description and the accompanying drawings, in which:

BRIEF DESCRIPTION OF THE INVENTION

DETAILED DESCRIPTION OF THE INVENTION

Figure 1:
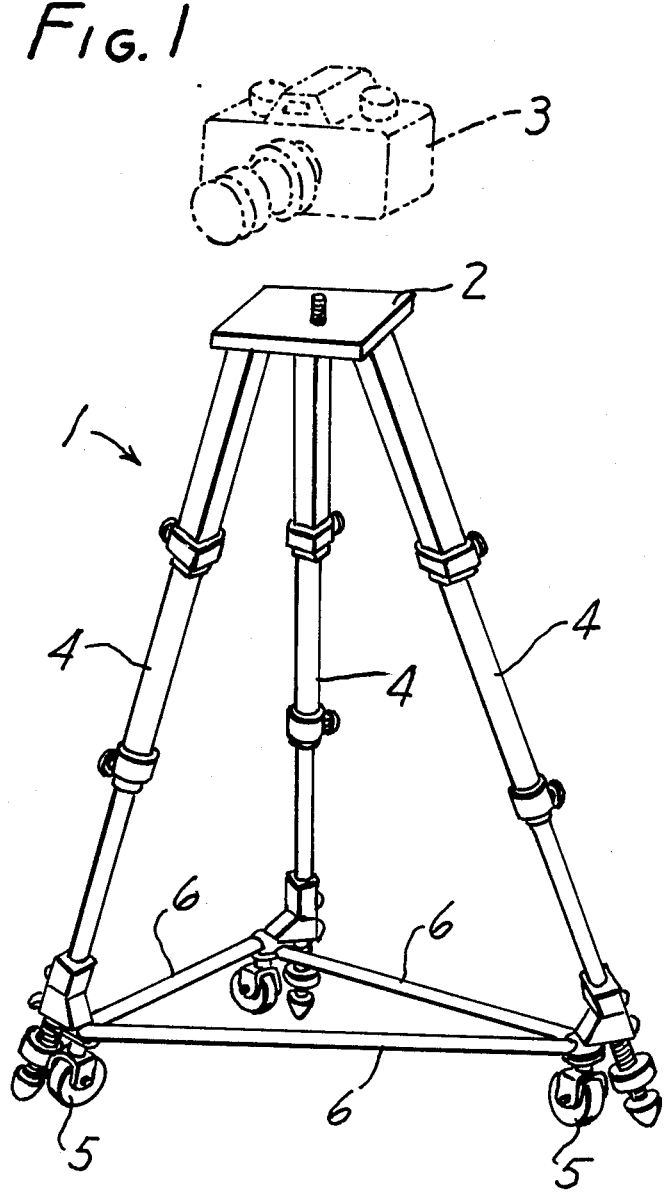
FIG. 1 is a perspective view of an embodiment of this invention.

Referring to FIG. 1, in the embodiment of the present invention, 1 is a tripod, 2 is a pan head of the tripod 1 for supporting a camera 3 etc. 4, 4, 4 are legs of the tripod 1 and 5, 5, 5 are caster wheels at the ends of the legs 4, 4, 4. In this invention the ends of the legs 4, 4, 4 are connected by three elastic strings 6, 6, 6 ("elastic means").

Figure 2:
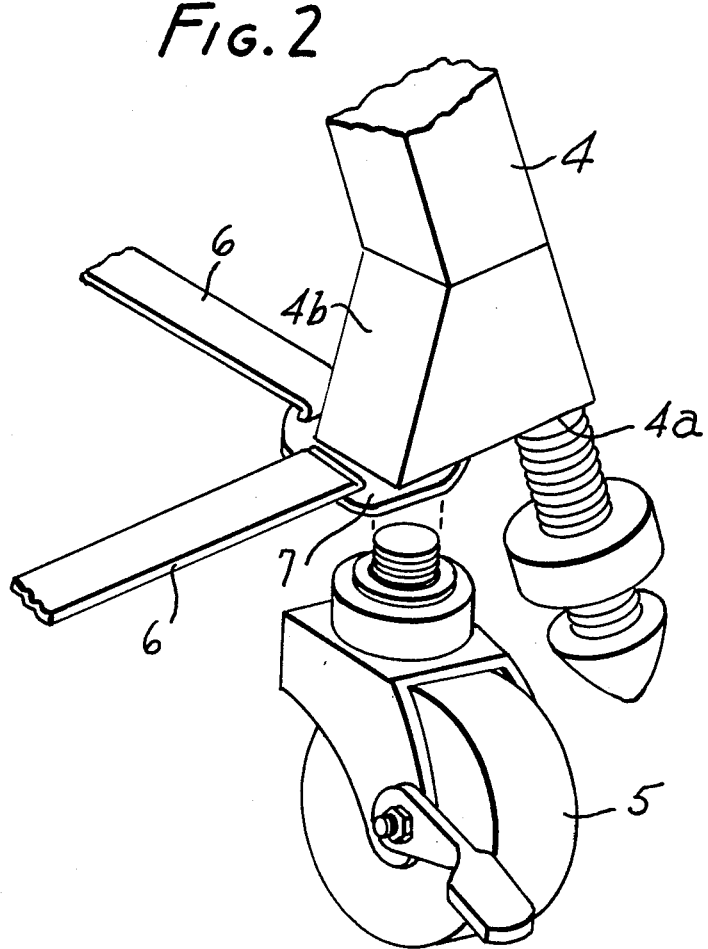
FIG. 2 is a perspective view at the end of a leg.

As shown in FIG. 2, the end 4a of the leg 4 has an enlargement in which a thread hole for inserting the screw of the caster wheel 5 is provided. A connecting part 7 is sandwiched between the expansion 4a and the caster wheel 5.

Figure 3:
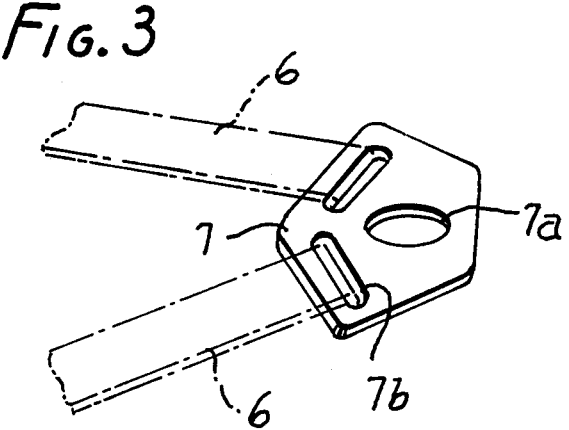
FIG. 3 is a perspective view for a connecting parts of the elastic strings.

As shown in FIG. 3 the connecting part 7 has a hole 7a for inserting the screw of the caster wheel 5 and a pair of slots 7b, 7b for connecting said elastic strings 6, 6 at an angle of 60 degrees.

I claim:

1. A tripod having leg stabilizers comprising;
   an enlargement at the end of each leg of said tripod;
   each of said enlargements having a threaded hole for receiving the threaded portions of a caster wheel;
   a plurality of elastic means connecting the bottom of the legs of said tripod;
   said plurality of elastic means being secured on the end of each leg by each of said caster wheels.

2. The tripod according to claim 1 including; a connecting part for connecting said elastic means between each leg of said tripod said connecting means having slots for receiving said elastic means and a hole for receiving the threaded screw on each of said caster wheels whereby said connecting means is secured to the end of each tripod leg by attachment of said caster wheels.

3. The tripod according to claim 2 in which each of said elastic means is a rubber belt.

4. The tripod according to claim 2 in which each of said elastic means is a resilient spring line.

* * * * *